June 29, 1954  A. F. HICKMAN  2,682,295
RESILIENT SEAT SUSPENSION
Filed April 18, 1950  4 Sheets-Sheet 3
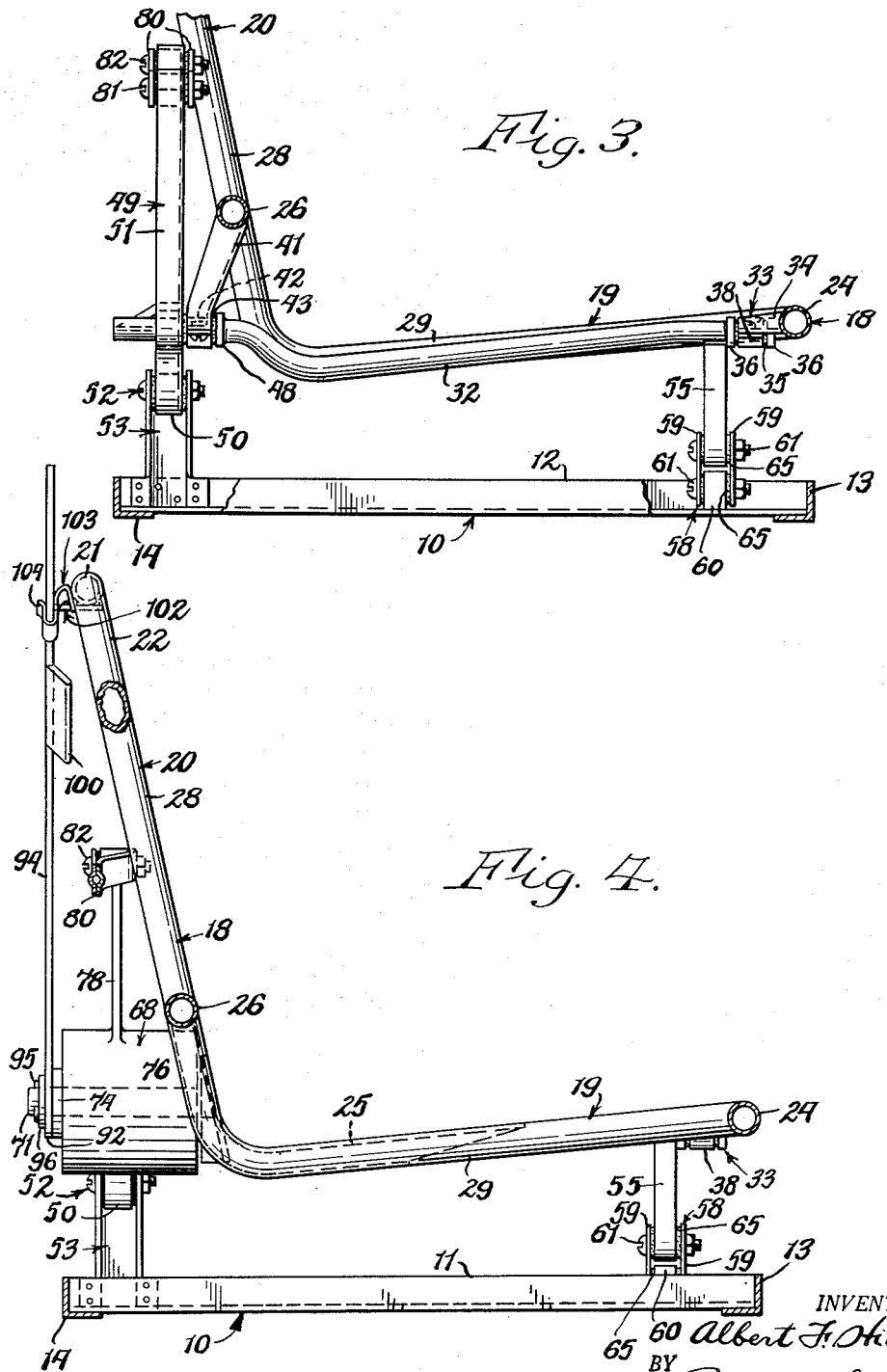
INVENTOR.
Albert F. Hickman
BY
Popp and Sommer
Attorneys.

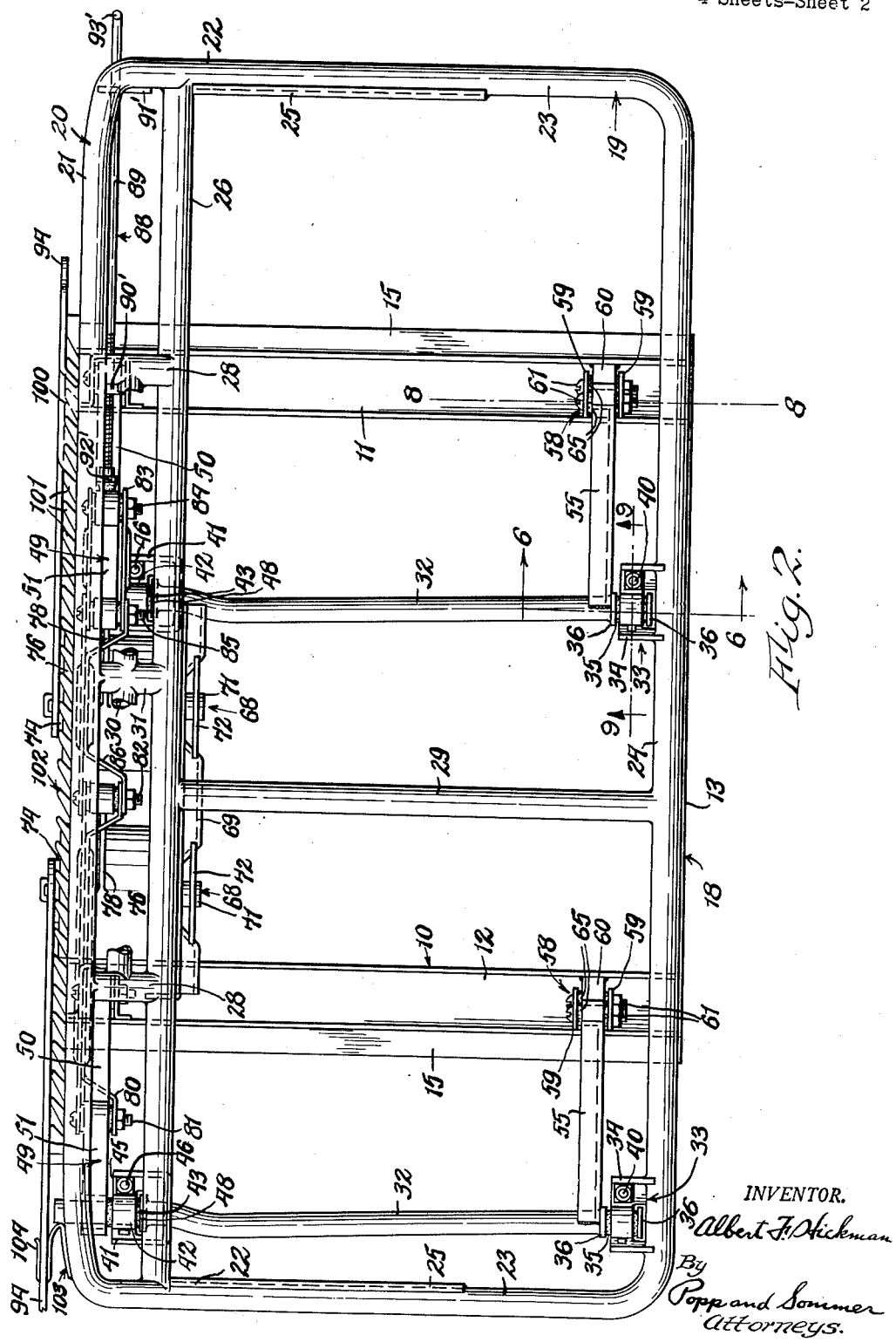

June 29, 1954 A. F. HICKMAN 2,682,295
RESILIENT SEAT SUSPENSION
Filed April 18, 1950 4 Sheets-Sheet 4
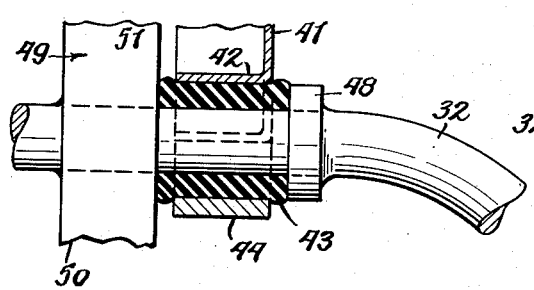
Fig. 5.
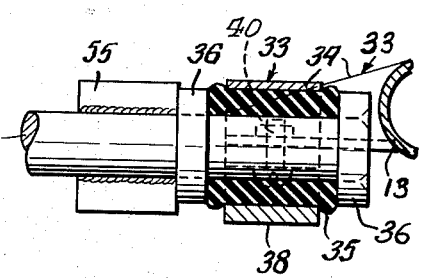
Fig. 6.
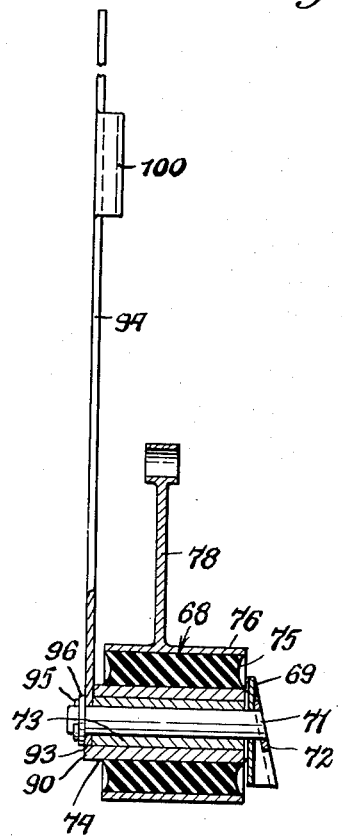
Fig. 7.
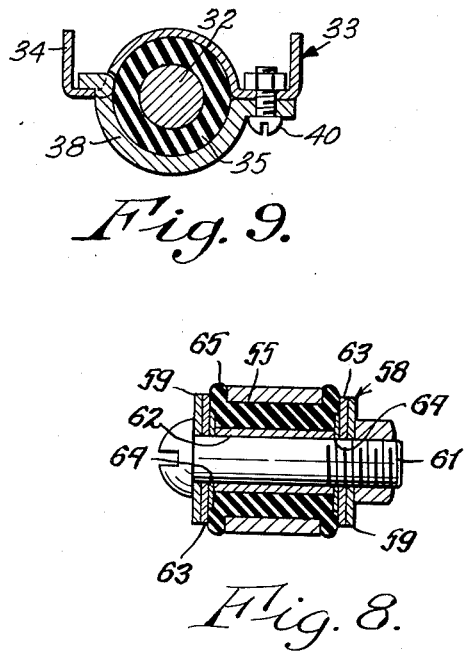
Fig. 9.
Fig. 8.
INVENTOR.
Albert F. Hickman
BY
Popp and Sommer
Attorneys.

Patented June 29, 1954

2,682,295

UNITED STATES PATENT OFFICE 2,682,295

RESILIENT SEAT SUSPENSION

Albert F. Hickman, Eden, N. Y., assignor to Hickman Industries, Inc., Eden, N. Y., a corporation of New York Application April 18, 1950, Serial No. 156,545

9 Claims. (Cl. 155—50)

This invention relates to a resilient seat suspension and more particularly to such a seat suspension designed for use in truck cabs to seat two or more persons, including the driver.

The design of a seat for a truck cab presents special problems not encountered in passenger vehicles. The main springs for trucks are necessarily strong enough to carry heavy loads and therefore when the trucks are only partly loaded, or completely unloaded, the spring frequencies are considerably above 100 cycles per minute which causes a very uncomfortable and fatiguing ride unless the driver and the riders are protected by comfortable and practicable seating equipment. If conventional cushions having soft internal springs are used the bottom cushions are subjected to an excessive amount of action which soon breaks the bottom cushion materials and requires repair and replacement thereof. Further, such excessive action of the bottom cushion is necessarily accompanied by an excessive amount of movement between the back of the occupant and the back cushion. This is very uncomfortable and causes excessive clothing as well as back cushion wear. A solution to the problem of seating in truck cabs has been found by providing a seat frame having a seat part and a back part which is rigid with the seat part and by providing a spring suspension between this seat frame and the vehicle body which is specially designed to meet the particular problems encountered in trucks. With such a suspension and with proper upholstery of the seat frame the driver can be given a comfortable and non-fatiguing ride and the driver left in full control of the truck at all times.

The present invention is directed to a spring suspension for such a seat frame designed to accommodate two or more persons, including the driver.

Accordingly, one of the principal objects of the present invention is to provide a suspension for a truck seat frame designed to accommodate two or more persons and which has a low spring frequency, that is, in the order of from 65 to 75 cycles per minute.

Another object of the invention is to provide a spring suspension for such a multiple occupancy seat which will operate at such desirable frequency regardless of the number of occupants or the weight thereof. This is achieved by providing a plurality of springs which can be successfully cut into operation so that with one occupant only one spring is used thereby to increase the requisite degree of spring deflection to provide the desirable low frequency for the single occupant. If two occupy the seat, another spring is cut into operation, the weight of the two occupants insuring the requisite degree of deflection of the two springs to again provide the desirable low frequency ride. The degree of wind-ups of both springs is also preferably adjustable to permit of accommodating the seat to the height and to provide the degree of spring softness and frequency desired by the occupant or occupants.

Another object of the invention is to provide such a spring suspension for a multiple occupancy seat in which the seat frame is permitted to move against a geometric resilient resistance relative to the vehicle body on which the seat frame is mounted.

Another object is to provide such a spring suspension which provides the maximum safety and comfort and leaves the driver in full control of all control levers and wheels of the vehicle.

Another object is to provide such a spring suspension in which the multiple occupancy seat frame moves with the occupant or occupants and is not drawn or jerked away from the occupants whenever the pressure imposed by the occupant upon the seat becomes negative.

Another object is to provide such a spring suspension which reduces and cushions the vertical impacts from the vehicle against the multiple occupancy seat and its occupants without imposing undue thrusts on the pivotal connections which connect the seat part with the vehicle frame.

Another object is to provide such a seat suspension in which torsion springs are employed to provide a longer and variable spring resistance range.

Another object is to provide such a seat suspension in which the resilient support is provided with rubber torsion springs which are simple, compact and low in cost and will have long life and freedom from service difficulties.

Another object is to provide such a spring suspension including rubber torsion springs in which the rubber torsion springs have a simple mounting on the seat frame and have a simple and direct connection with the linkage connecting the seat frame with the vehicle frame.

Another object is to provide such a spring suspension in which geometric resilient resistance is obtained in a compact structure which requires no lubrication and in particular is free from clicks, squeaks or other objectionable noises.

Another object is to provide such a seat suspension in which the load from the seat frame to the suspension and from the spring suspension to the vehicle frame is distributed at a plurality of spaced points.

Another object is to provide such a spring suspension in which both fore-and-aft and lateral tilting of the seat frame is prevented to any objectionable extent.

Another object is to provide a simple and low cost spring suspension for a truck seat frame designed for the occupancy of two or more persons which is competitive in price with standard spring cushion seats now in use, the necessity for shock absorbers, in particular, being avoided.

Another object is to provide such a spring suspension which is extremely compact and sturdy and which will stand up under conditions of severe and constant use with very little servicing.

Other objects and advantages of the invention will be apparent from the following description and drawings in which:

Fig. 2 is a top plan view thereof.

Fig. 3 is a fragmentary vertical section taken along line 3—3, of Fig 1.

Fig. 4 is a vertical sectional view taken along line 4—4, Fig. 1.

Fig. 5 is an enlarged fragmentary vertical section taken generally on line 5—5, Fig. 1, and showing the construction of the rear bearings for the crank shafts journalled on the seat frame.

Fig. 6 is an enlarged vertical section taken on line 6—6, Fig. 2, and showing the construction of the front bearings for these crank shafts.

Fig. 7 is a generally vertical section taken on line 7—7, Fig. 1, and showing a construction of one of the rubber springs and the manner in which it is mounted and connected to the other parts of the spring suspension.

Fig. 8 is a vertical section through one of the shackle bearings, this section being taken for example on line 8—8, Fig. 2.

Fig. 9 is a section taken generally on line 9—9, Fig. 2.

Figure 1:
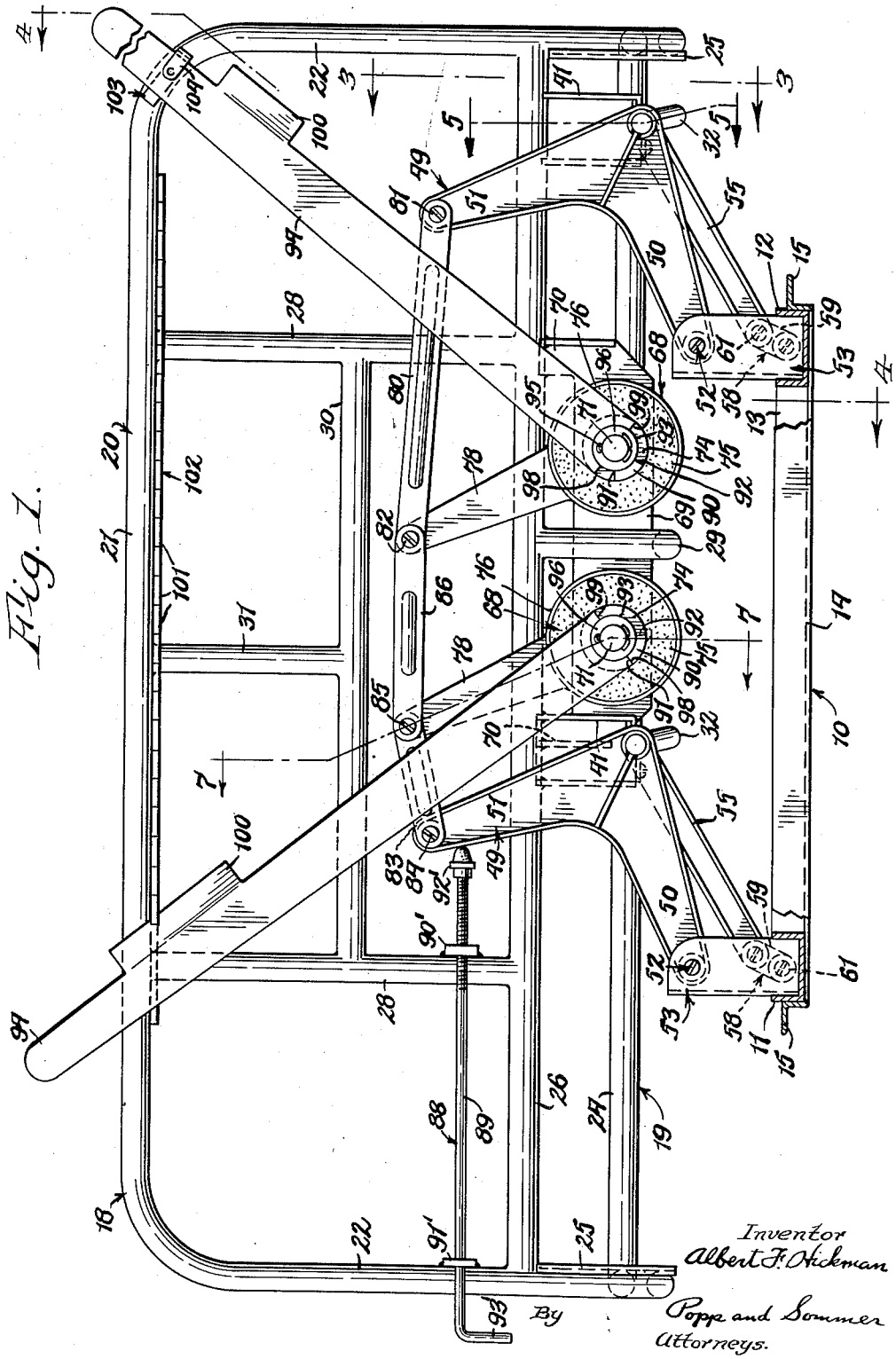
Fig. 1 is a rear elevational view of a truck cab seat designed for use by two or more occupants and supported on a spring suspension embodying the present invention.

The seat forming the subject of the present invention is shown as supported upon a base or subframe indicated generally at 10 and which in plan is in the form of a rectangular frame. While this base or subframe 10 can be of any suitable construction it is shown as comprising a pair of side channel bars 11 and 12 arranged with their channels opening upwardly and having their ends arranged in and welded to transverse angle bars 13 and 14. To permit fore-and-aft adjustment of the subframe or base frame 10 to suit the leg length of the driver, angle bars 15 can be welded to the outer sides of the side bars 11 and 12 to extend longitudinally thereof. These fore-and-aft rails 15 can be supported on any conventional mechanism for adjusting the base or subframe 10 in a direction forwardly and rearwardly of the vehicle. Such adjusting mechanism forms no part of the present invention and hence is not shown.

The seat frame 18 is shown as made of tubing and as comprising a seat part 19 rigid with a back part 20. The margin or rim of both the seat part and back part of the seat frame 18 is made of a single length of tubing formed to provide a top bar 21 for the back part, generally vertical side bars 22 for the back part, generally horizontal side bars 23 for the seat part and a front bar 24 for the seat part. The bend between the side bars 22 and 23 of the back part 20 and seat part 19, respectively, can be reinforced by a curved channel 25, the flanges of which are shown as welded to the inner faces of these bars around these bends. A horizontal cross bar 26 connects the lower parts of the vertical side bars 22 of the back part of the seat frame and this cross bar 26 is in turn connected to the top bar 21 by a pair of spaced vertical bars 28. Near the center of the seat frame the cross bar 26 is connected to the front bar 24 by an L-shaped bar 29 which conforms to and is in line with the side bars 22 and 23 of the back part 20 and seat part 19, respectively. These spaced vertical bars 28 of the back part 20 of the seat frame are in turn connected by a horizontal cross bar 30, and this horizontal cross bar 30 is in turn connected at its center by a vertical bar 31 with the center of the upper bar 21 of the back part 20 of the seat frame.

The spring suspension forming the subject of the present invention includes a pair of crank shafts 32 which are journalled on the seat frame 18 and extend fore-and-aft along the seat part 19 thereof. It will particularly be noted that one of these crank shafts 32 is located near one side extremity of the seat frame, this being the right hand side of the seat frame as viewed in Fig. 1, whereas the other of these crank shafts 32 is arranged near the center of the seat frame. Each of these crank shafts 32 is shown as being bent to clear the parts of the seat frame as the seat frame moves up and down, but such bending is a matter of design and forms no part of the present invention. At its front end each of these crank shafts 32 is journalled on the front bar 24 of the seat part 19 of the seat frame by a bearing indicated generally at 33 and best illustrated in Figs. 2 and 6.

Each of these bearings is shown as comprising a U-shaped bracket 34 welded at its forward edge to the front bar 24 of the seat part 19 and formed to provide an upper half bearing support for a rubber bushing 35 around the front end of the crank shaft and held between two collars 36 suitably secured to this crank shaft. The lower half of the rubber bushing 35 is supported by a lower half bearing member 38 having one end embracing the lower part of the rubber bushing and having its other end secured to the bottom of the bracket 34 by a bolt and nut 40 or in any other suitable manner.

The rear end of each of the crank shafts 32 is journalled on the cross bar 26 of the back part 20 of the seat frame. For this purpose, a bracket 41 is welded at its upper end to this cross bar 26 and projects downwardly therefrom, the lower part of each of these brackets being formed to provide an upper half bearing 42 for a rubber bushing 43 which surrounds the rear end of the corresponding crank shaft 32. The lower half of this rubber bushing is embraced by one end of a half bearing member 44, the other end of this half bearing member being secured to the underside of the bracket 41 by a screw or bolt 46 or in any other suitable manner.

Each of these rubber bushings 43 is interposed between a collar 48 on the corresponding crank shaft 32 and a bell crank lever 49 welded to shaft 32. Each of these bell crank levers is arranged in rear of the back part 20 of the seat frame 18 and has a generally horizontal crank arm 50 and a generally vertical upwardly projecting crank arm 51. The two generally horizontal crank arms 50 of these bell crank levers project in the same direction, and each terminates directly below the center of the seating space for each individual upon the seat frame. The seat as illustrated is designed for the occupancy of a driver and a rider and hence the outer end of each generally horizontal crank arm 50 of each bell crank lever is arranged approximately one quarter of the distance inwardly from the corresponding side of the seat frame.

This outer end of each of the generally horizontal crank arms 50 of the bell crank lever 49 is suitably journalled, as indicated at 52, to a bracket 53 which is shown as being of U-shape in horizontal section and as suitably secured at its lower end within the corresponding fore-and-aft side channel bar 11 of the base or subframe 10 of the seat.

To the front end of each of the crank shafts 32 is welded, immediately in rear of its bearing 33, a crank arm 55 which extends in the same general direction as the lower horizontal crank arm 50 of the corresponding bell crank lever 49. However, it will particularly be noted that each of these crank arms 55 inclines downwardly to a greater degree than the corresponding generally horizontal crank arm 50 of the corresponding bell crank arm 49. This is because each of the crank arms 55 is arranged directly under the seat part 19 of the seat frame whereas the bell crank levers 49 are arranged in rear of the back part 20 of the seat frame. Accordingly, the crank arms 55 are required to clear the seat cushion (not shown) on the seat part 19 of this seat frame and it is accordingly necessary that the outer end of each crank arm 55 be located close to the base or subframe 10 of the seat structure.

To compensate for this difference in angularity between each crank arm 55 and generally horizontal crank arm 50 of the corresponding bell crank arm 55 is connected to the base or subframe 10 by a shackle indicated generally at 58. However, the amount of compensation so required is very small and can be provided by a rubber bushing of adequate size in lieu of the shackle 58. Each shackle 58 is shown as comprising a pair of plates 59 which connect the outer or free end of each crank arm 55 with a bearing housing 60 suitably welded to the forward end of the corresponding side channel bar 11 or 12 of the base or subframe 10. A typical shackle bearing is illustrated in Fig. 8 from which it will be noted that each of these shackle bearings comprises a bolt 61 extending through the two plates 59 of the shackle and as carrying a metal bushing 62 held between washers 63 and 64 which are interposed between each end of the metal bushing 62 and the corresponding side plate 59 of the shackle. This metal bushing 62 is embraced by a rubber bushing 65, this in turn being embraced by the end of the corresponding crank arm 55 or by the housing 60. It will be seen that each of these shackles 58 permits free swinging movement of the corresponding crank arm 55 notwithstanding that the axis of its outer pivot 61 is out of line with the axis of the pivot mounting 52 for the corresponding bell crank arm 50.

The resilient support for the seat frame is provided by a pair of rubber torsion springs indicated generally at 68. Both of these rubber springs are mounted on a depending bracket or plate 69 which, as best shown in Fig. 1, have ends 70 which project upwardly and are welded to the underside of the cross bar 26 of the back part 20 of the seat frame. Each of these rubber torsion springs is mounted on a pin 71 which is secured to and projects rearwardly from this depending bracket 69, these pins also projecting through and being secured to reinforcing plates 72 suitably secured to the forward face of the depending bracket 69, as best shown in Fig. 2. On each of these rearwardly projecting pins 71 is rotatably mounted a sleeve 73, each of these sleeves 73 in turn rotatably supporting a sleeve 74 to the peripheral face of which is secured a cylindrical body of rubber 75, this body of rubber being vulcanized to this sleeve 74. This body of rubber is also vulcanized to the bore of a surrounding sleeve 76, and from this outer sleeve 76 a lever arm 78 projects in a generally upward direction, as best shown in Fig. 1.

A link 80 is pivotally connected at one end, as indicated at 81, to one of the generally upright crank arm 51 of one of the bell crank levers 49 and at its other end this link is pivotally connected, as indicated at 82, to the outer end of the crank arm 78 of the adjacent rubber spring 68. Similarly, a short link 83 is pivotally connected, as indicated at 84, to the outer end of the generally upright crank arm 51 of the other bell crank lever 49 and at its other end is pivotally connected, as indicated at 85, to the crank arm 78 of the other rubber spring 68. The pivots 82 and 85 at the free ends of the crank arms 78 of the two rubber springs 68 also carry a link 86 which interconnects the outer ends of these two crank arms 68.

It is desirable to limit the degree of maximum upward movement of the seat frame 18 relative to the base or subframe 10, and to this end an adjustable stop, indicated generally at 88, is provided. As best shown in Fig. 1, this adjustment comprises a horizontal rod 89 having an inner threaded end screwing into a threaded ear 90' which is welded to and projects rearwardly from the vertical bar 28 of the back part 20 of the seat frame and having its opposite end rotatably supported in an ear 91' welded and projecting rearwardly from one vertical side bar 22 of the back part 20 of the seat frame. This rod 89 is in line with the two bell crank levers 49 and at its inner end is provided with a rubber bumper 92' which is arranged in the path of the generally upright arm of the adjacent bell crank arm 51. The opposite end of the rod 89 is bent to provide a handle 93' by means of which the rod can be turned so as to adjust the rubber bumper 92' toward and from the center of the seat frame. It will be noted that the handle 93' is conveniently located at one side of the seat frame so that it can readily be turned. It will also be seen, since the upward and downward movement of the seat frame 18 causes a corresponding rotation of the bell crank levers 49 around the axes of their crank shafts 32, that the adjustment of the rod 89 serves to determine and limit the upward movement of the seat frame.

A feature of the invention resides in the mechanism for rendering either of the rubber springs 68 inoperative or for adjusting the initial degree of tension or wind-up imposed by either of these springs. This mechanism is preferably constructed as follows:

As best shown in Figs. 1 and 7, a portion of the inner metal sleeve 74 of each rubber torsion spring 68 projects rearwardly beyond the end of the sleeve 73 which it surrounds so as to provide an axially projecting segment 90 forming axially extending stop shoulders 91 and 92. Each of these stop segments 90 engages the rounding end 93 of an adjusting lever 94, this adjusting lever being rotatably mounted on the projecting end of the corresponding pin 71 which supports the rubber spring. Each of these adjusting levers is shown as retained on its pin 71 and in end engagement with the corresponding stop segment 90 by a cotter pin 95 and a washer 96 at the rear extremity of the corresponding pin 71. Each of the adjusting levers 94 is formed to provide a pair of stop shoulders 98 and 99 arranged in the paths of the stop shoulders 91 and 92 of the segmental extension 90 respectively. It will be noted that the stop shoulders 91 and 92 of the segmental extension 90 of each sleeve 74 are in approximately a 45° angular relation to each other whereas the stop shoulders 98 and 99 of each adjusting arm 94 are in 180° angular relation to each other. Accordingly, a substantial clearance is provided, the purpose of this clearance being to avoid any clicking of these stop shoulders when either of the rubber springs is adjusted to its completely unloaded condition.

Each of the adjusting levers 94 projects generally upwardly and to a position beyond the upper extremity of the upper cross bar 21 of the back part 20 of the seat frame 18. Each of the adjusting levers 94 is shown as provided along one edge with an angularly disposed lip or flange 100, each of these angularly disposed lips being adapted to be caught between any pair of teeth 101 of a rack 102. This rack is in the form of a bar welded to the upper cross bar 21 of the back part 20 of the seat frame with its teeth projecting rearwardly. It will be noted that the teeth 101 of the rack bar, as well as the lips or flanges 100 of the two adjusting levers 94, project at about a 45° angle relative to the upper cross bar 21 of the seat frame as viewed in Fig. 2, this angularity insuring that either lip or flange 100 of the adjusting levers is firmly caught between any two selected teeth 101 and without danger of rattling or becoming loose.

The outward movement of one or both of the adjusting levers 94 can be limited by a small clip 103 at the corresponding side of the seat frame, this clip being shown as being in the form of an S-shaped strip of metal having one end welded to the juncture between the upper cross bar 21 and the vertical end bar 22 of the back part 20 of the seat frame, the opposite end of this clip forming a spring clasp 104 for the upper extremity of the corresponding adjusting lever 94.

In the drawings the left hand adjusting lever, as viewed in Fig. 1, is shown as adjusted counterclockwise to a position in which it provides initial tension or wind-up in its rubber torsion spring 68. The right hand adjusting lever 94, as viewed in Fig. 1, is shown in a released position in which its rubber torsion spring is free and completely unloaded. In this last position, the clip 103 retains this adjusting lever against rattling or dropping beyond the released position shown. This is the position of the parts when only one occupant, this being, of course, the driver is occupying the seat, the driver occupying the left hand side of the seat frame as viewed in Fig. 1. It will be noted that in this position of the parts the left hand rubber torsion spring 68, as viewed in Fig. 1, is loaded and the right hand rubber torsion spring 68 is completely unloaded, this last spring only being loaded when the seat is to be occupied by a rider in addition to the driver.

With the parts adjusted to this position, downward movement of the seat frame 18 relative to the base or subframe 10 causes a clockwise rotation of each of the crank shafts 32, together with the bell crank levers 49 and crank arms 55 fast thereto. This is due to the fact that each of the crank shafts 32 is journalled in the bearings 33 and 43 on the seat part 19 of the seat frame 18 and the free ends of the crank arms 55 and the crank arms 50 of the bell crank levers 49 are pivoted to the base or subframe 10. This clockwise rotation of the bell crank levers 49 is transmitted through the links 80 and 83 to the crank arms 78 of the rubber springs 68. Accordingly, these crank arms 78 of the two rubber springs 68 are similarly rotated clockwise, thereby to impose a clockwise force on the peripheries of the rubber bodies 75 of the two rubber springs 68. This force is transmitted to the metal sleeve 74 on which each of these rubber bodies 75 is vulcanized. In the case of the left hand rubber spring 68, as viewed in Fig. 1, the lever arm 94 has been swung to a position in which its stop shoulder 98 is in engagement with the stop shoulder 91 of the segmental extension 90 of this sleeve 74 of the corresponding rubber spring 68. Accordingly, the rubber body of this left hand rubber torsion spring 68 is already under pressure and its inner metal sleeve 74 is not free to move any further in a clockwise direction as viewed in Fig. 1. Accordingly, the entire rotative force so impressed on the periphery of the left hand rubber torsion spring 68 by the clockwise movement of its crank arm 78 is resisted by this rubber body 75 of this torsion spring, this left hand rubber spring thereby supplying the entire resilient support for the seat frame.

The right hand rubber torsion spring does not come into action because its adjusting lever 94 is adjusted to its extreme right hand side position as viewed in Fig. 1. In this position there is a substantial clearance between the stop shoulder 98 of this right hand adjusting lever and the stop shoulder 91 of the segmental extension 90 of the inner metal sleeve 74 of the right hand rubber spring 68. Accordingly, when the downward movement of the seat frame 18 so effects a clockwise movement of the crank arm 78 of the right hand rubber torsion spring 68, as viewed in Fig. 1, this clockwise movement is transmitted through its rubber body 75 to its inner metal sleeve 74, but since there is nothing to resist rotation of this inner metal sleeve 74, this sleeve merely rotates about the sleeve 73 without impedance. The spacing of the stop shoulder 98 of the right hand adjusting lever 94 and the stop shoulder 91 of the segmental extension 90 of the inner metal sleeve 74 of the right hand rubber torsion spring 68, as viewed in Fig. 1, is such that when these parts are in the completely unloaded position of adjustment shown in Fig. 1, the stop shoulder 98 does not touch the companion stop shoulder 91 and even when the seat frame is completely depressed. Accordingly, no objectional clicking noise develops from that spring assembly which is rendered inoperative.

Still assuming that the seat frame 18 is occupied only by the driver and that hence only one rubber torsion spring 68, namely, that one supporting his end of the seat frame is in operation, if the driver finds the seat too high or desires a greater degree of resiliency, in order to reduce the windup or tension of the spring 68 all that he need do is to seize the adjusting lever 94 at the left hand side, as viewed in Fig. 1, and release it from the corresponding pair of teeth 101 of the rack 102 and adjust it further to the right along this rack to another pair of its teeth. This release and readjustment of this adjusting lever 94 is readily effected by first moving it sufficiently far to the left, as viewed in Fig. 1, to release its inclined lip or flange 100 from the engaged pair of teeth whereupon the driver can bend the adjusting lever rearwardly in which position he can move it freely to the right to select another pair of teeth. Assuming that the driver, in so adjusting the seat to have a reduced degree of wind-up or tension in the spring 68 and hence a greater degree of resiliency or a lower elevation of the seat moves the left hand adjusting lever 94, as viewed in Fig. 1, from the 45° position shown in Fig. 1 to, say, 60° position, it will be seen that the stop 98 of this adjusting lever 94 has been adjusted an equal number of degrees clockwise as viewed in Fig. 1. Accordingly, the initial degree of tension or wind-up imposed on the rubber body 75 of the left hand rubber torsion spring 68 has been reduced so that the driver is supported by a softer spring and also is supported at a lower elevation because his weight lowers the seat frame 18 to a greater degree because of this lowered initial tension or wind-up on the rubber torsion spring supporting him.

If the seat frame is to be occupied by a second occupant or rider in addition to the driver, the other or right hand rubber torsion spring as viewed in Fig. 1 is rendered operative. This is done by seizing the outer end of the right hand adjusting lever 94 as viewed in Fig. 1, and moving it counterclockwise. In so moving this adjusting lever counterclockwise it is preferably bent rearwardly sufficiently far so that its angular lip or flange 100 does not click along the teeth 101 of the rack bar 102. As this adjusting lever is so moved counterclockwise, its stop 98 is brought toward the stop 91 of the segmental extension 90 of the metal sleeve 74 of the corresponding rubber torsion spring 68 until these stops engage. Continued movement of this adjusting lever 94 counterclockwise as viewed in Fig. 1 causes a corresponding counterclockwise rotation of the inner metal sleeve 74 of the corresponding rubber torsion spring 68. This rotation of this inner metal sleeve 74 of this rubber torsion spring causes an initial wind-up or tension to be imposed upon the rubber body 75 of this rubber torsion spring, movement of crank arm 78 to the left, Fig. 1, being stopped by stop 91' on the adjustable rod 88. Accordingly, when the second occupant a rider sits on the seat frame 18, the second rubber spring 68 supporting the right side of the seat frame 18 as viewed in Fig. 1 will be actuated in exactly the same manner as previously described with reference to the other rubber torsion spring under the driver side of the seat frame. By catching the lip or flange 100 of the right hand adjusting lever 94, as viewed in Fig. 1, between a corresponding pair of the teeth 101 of the rack 102, the rubber torsion spring 68 under the rider side of the seat frame can be adjusted to have any desired initial degree of wind-up. Accordingly, the occupants can select the degree of resiliency which they desire.

It will also be noted that by tying the ends of the two crank arms 78 of the rubber torsion springs 68 through the medium of the link 86 the entire seat frame is prevented from tipping sidewise to any degree when occupied only by a driver or by a rider or when subjected to lateral thrusts.

Thus if only the driver sits down on the left hand side of the seat frame 20, the downward pressure on that end of the seat frame causes a clockwise rotation of the left hand bell crank lever 49 as viewed in Fig. 1. Through the links 83, 86 and 80, this rotation of the left hand bell crank lever 49 causes an identical rotation of the right hand bell crank lever 49. This rotation of this right hand bell crank lever pulls down the right hand end of the seat frame 20 to the same degree as the left hand end was pushed down by the driver sitting on it. It will therefore be seen that the links 83, 85 and 80 insure that both ends of the seat frame 20 rise and fall in unison regardless of the weight distribution thereon.

Since by this tying together all parts of the seat frame are compelled to move vertically in unison and one side cannot move lower than the other, it would make no difference, for a single occupant, such as the driver, whether the left or right hand rubber torsion spring 68 were rendered operative. Actually, because otherwise the left hand (Fig. 1) adjusting arm 94 would engage the right hand adjusting arm 94, the rubber spring 68 under the driver must be rendered operative before the rubber spring under the rider can be rendered operative. The important feature is that one or the other of these torsion springs can be rendered inoperative for occupancy with one individual. With two rubber springs 68 adequate for two persons, both springs used together would have too high a frequency for one occupant because the one occupant would not deflect both springs far enough in riding on the seat. By cutting one of the torsion springs 68 out of operation for single occupancy, the single occupant deflects the single torsion spring sufficiently to have the desired low frequency ride, that is, below 75 cycles per minute.

It will also be noted that since the crank arms 55 of the crank shafts 32 are at a greater angle to the horizontal than the crank arms 50 of the bell crank levers 49, neither of these crank arms 55 interferes with any part of the seat frame, a greater angle being permitted for the bell crank arms 50 because the bell cranks 49 are located in the rear of the seat frame and not under the seat part 19 thereof as is the case with the crank arms 55.

It will be noted that the present invention provides a double occupancy seat which will operate at a sufficiently low frequency to give the desired ride and at the same time can be produced at sufficiently low cost to compete with single occupancy seats of this general type such as now are on the market and also with standard spring filled cushion seats. The present seat can be supplied as standard or optional equipment in lieu of a conventional spring filled cushion for driver and rider and does not require a redesigning of the seating system, such as is necessary when only a single occupancy seat of this general type is supplied for the driver of the truck with the passenger supported on spring filled cushions. In connection with the cost of the seat of the present invention, it will be noted that it is made of low cost and relatively light weight parts and in particular requires no shock absorbers which are expensive additions to seats of this character.

With the seat of the present invention it is possible to maintain a ride frequency of from 65 to 75 cycles per minute with a total maximum movement of 3 or 4 inches resulting from normal heavy shock conditions and with approximately an additional inch of movement for very bad impacts on extremely rough roads. At the same time the seat suspension forming the subject of the present invention is free from friction so that when the truck is traveling over smooth concrete roads the road joints or seams will not be felt by the occupant or occupants of the seat. These continuous small vibrations, if not dissipated, become very tiresome and annoying to the driver and occupants of a truck.

With the present seat suspension, regardless of how heavy or how light the driver may be, or whether one, two, or three persons occupy the seat, it is possible to obtain a ride frequency under 75 cycles per minute. It is also possible to adjust the softness of the spring as may be desired and also to adjust the height of the seat to suit the height of the driver of the truck.

The seat as shown in the drawings can also be installed in any conventional cab, both in regard to the height of the seat cushion from the seat riser of the cab and also as to the fore-and-aft dimensions of the seat.

By "normal position" as used in the accompanying claims is meant the unloaded position of the parts as shown.

From the foregoing it will be seen that the present invention provides a multiple occupancy seat suspension which is particularly applicable to trucks and the like and which is fully adjustable to provide the desired low frequency ride regardless of the number of occupants and also their weight. The suspension is also simple, and not subject to breakdown or loss of utility and in particular can be produced at such low cost as to compete with the single occupancy seats of this general type now on the market as well as conventional spring filled cushions.

I claim:

1. A spring suspension for resiliently supporting on a subframe a seat frame having a back part rigidly connected with and rising from the rear of a generally horizontal seat part, comprising a pair of transversely spaced, generally parallel fore-and-aft crank shafts journalled on said seat part, a first pair of generally parallel crank arms each fast to the rear end of the corresponding crank shaft and normally inclining downwardly and laterally therefrom, a second pair of generally parallel crank arms each fast to the front end of the corresponding crank shaft and normally inclining downwardly and laterally therefrom in the same direction as said first pair of crank arms, said crank arms being of substantially the same effective length and generally parallel with said first pair of crank arms in all positions of said seat frame, a pivot mounting connecting the free end of each of said crank arms with said subframe, a third crank arm fast to the rear end of each of said crank shafts and normally projecting upwardly therefrom in rear of said seat part, a linkage connecting said third crank arms to oscillate in unison, and means resisting oscillation of said crank shafts.

2. A spring suspension for resiliently supporting on a subframe a seat frame having a back part rigidly connected with and rising from the rear of a generally horizontal seat part, comprising a pair of transversely spaced, generally parallel fore-and-aft crank shafts journalled on said seat part, a first pair of generally parallel crank arms each fast to the rear end of the corresponding crank shaft and normally inclining downwardly and laterally therefrom, a second pair of generally parallel crank arms each fast to the front end of the corresponding crank shaft and normally inclining downwardly and laterally therefrom in the same direction as said first pair of crank arms, said crank arms being of substantially the same effective length and generally parallel with said first pair of crank arms in all positions of said seat frame, a pivot mounting connecting the free end of each of said crank arms with said subframe, a third crank arm fast to the rear end of each of said crank shafts and normally projecting upwardly therefrom in rear of said seat part, a linkage connecting said third crank arms to oscillate in unison, and means resisting oscillation of said crank shafts comprising a torsion spring mounted on the lower part of said seat frame in rear of the seat part thereof, and a lever operatively connecting said torsion spring with said linkage.

3. A spring suspension for resiliently supporting on a subframe a seat frame having a back part rigidly connected with and rising from the rear of a generally horizontal seat part, comprising a pair of transversely spaced, generally parallel fore-and-aft crank shafts journalled on said seat part, a pair of generally parallel crank arms of substantially the same effective length each fast to the front end of the corresponding crank shaft and normally inclining downwardly and laterally therefrom, a pair of bell crank levers each fast to the rear end of the corresponding crank shaft in rear of said seat part and having one arm projecting from the crank shaft in the same direction as the corresponding crank arm and having its other arm projecting upwardly from the crank shaft, a pair of pivot mountings on the rear of said subframe at substantially the same elevation and each operatively connected to the free end of said one of said arms of said bell crank levers, a second pair of pivot mountings on the front of said subframe and each operatively connected to the free end of one of said crank arms, and means on said seat frame and operatively connected to said other arms of said bell crank levers to resist oscillation thereof.

4. A spring suspension for resiliently supporting a seat frame on a subframe, comprising a resilient body mounted on one of said frames, means providing an adjustable anchorage between said resilient body and said one of said frames and operative to adjust the initial degree of wind-up of said resilient body, means operatively connecting said resilient body with the other of said frames to yieldingly resist movement of said frames relative to each other, a second resilient body mounted on one of said frames, means providing an adjustable anchorage separate from said first means providing an adjustable anchorage and arranged between said second resilient body and said last frame and operative to adjust the initial degree of wind-up of said second resilient body independently of said first resilient body, and means operatively connecting said second resilient body with the frame opposite that to which it is anchored, thereby to resist movement of said frames relative to each other.

5. A spring suspension for resiliently supporting a seat frame on a subframe, comprising a resilient torsion spring rotatively mounted on one of said frames, means providing an adjustable anchorage between said torsion spring and said one of said frames and operative to adjust the initial degree of wind-up of said torsion spring, a lever arm fast to said torsion spring, means operatively connecting said lever arm with the other of said frames to yieldingly resist movement of said frames relative to each other, a second resilient torsion spring mounted on one of said frames, means providing an adjustable anchorage separate from said first means providing an adjustable anchorage and arranged between said second torsion spring and said last frame and operative to adjust the initial degree of wind-up of said second torsion spring independently of said first torsion spring, a second lever arm fast to said second torsion spring, means operatively connecting said second lever arm with the frame opposite that to which said second torsion spring is anchored, thereby to resist movement of said frames relative to each other and means connecting said lever arms to rotate in unison.

6. A spring suspension for resiliently supporting a seat frame on a subframe, comprising a pair of transversely spaced, generally parallel crank shafts journalled on said seat frame, a crank arm fast to each end of each of said crank shafts, said crank arms being of substantially the same effective length, a pivot mounting connecting the free end of each of said crank arms with said subframe, a pair of torsion springs rotatively mounted on said seat frame with their axes generally parallel with the axes of said crank shafts, means operatively connecting each of said torsion springs with a corresponding one of said crank shafts to resist oscillation thereof, and means providing a separate adjustable anchorage for each of said torsion springs interposed between each of said torsion springs and said seat frame and arranged to adjust separately the rotative position of each of said torsion springs and the initial degree of wind-up of each torsion spring.

7. A spring suspension for resiliently supporting a seat frame on a subframe, comprising a pair of transversely spaced, generally parallel crank shafts journalled on said seat frame, a crank arm fast to each end of each of said crank shafts, said crank arms being of substantially the same effective length, a pivot mounting connecting the free end of each of said crank arms with said subframe, a pin fast to said seat frame and extending generally parallel with the axes of said crank shafts, a sleeve rotatably mounted on said pin, a rubber body surrounding and fast to said sleeve, means operatively connecting said rubber body with said crank shafts to resist oscillation of said crank shafts, and means holding said sleeve at different rotative positions on said pin thereby to adjust the initial degree of wind-up of said rubber body.

8. A spring suspension for resiliently supporting a seat frame on a subframe, comprising a pair of transversely spaced, generally parallel and horizontal crank shafts journalled on said seat frame to extend fore-and-aft thereof, a crank arm fast to each end of each of said crank shafts, said crank arms being of substantially the same effective length, a pivot mounting connecting the free end of each of said crank arms with said subframe, a torsion spring rotatively mounted on said seat frame with its axis generally parallel with the axes of said crank shafts, means operatively connecting said torsion springs with said crank shafts to resist oscillation thereof, and an adjustable anchorage for said torsion spring interposed between said torsion spring and seat frame and arranged to adjust the rotative position of said torsion spring and the initial degree of wind-up of said torsion spring and comprising an upright adjusting lever mounted on said seat frame in rear of the seat frame for rotation concentric with said torsion spring and connected with said torsion spring to resist rotation thereof relative to said seat frame, and means arranged to hold said adjusting lever at different angular positions about the axis of said torsion spring.

9. A spring suspension for resiliently supporting a seat frame on a subframe, comprising a pair of transversely spaced, generally parallel crank shafts journalled on said seat frame, a crank arm fast to each end of each of said crank shafts, said crank arms being of substantially the same effective length, a pivot mounting connecting the free end of each of said crank arms with said subframe, a torsion spring rotatively mounted on said seat frame with its axis generally parallel with the axes of said crank shafts, means operatively connecting said torsion spring with one of said crank shafts to resist oscillation thereof, and means providing an adjustable anchorage for said torsion spring interposed between said torsion spring and seat frame and arranged to adjust the rotative position of said torsion spring and the initial degree of wind-up of said torsion spring and comprising an adjusting lever mounted on said seat frame for rotation concentric with said torsion spring and connected with said torsion spring to resist rotation thereof relative to said seat frame, and means arranged to hold said adjusting lever at different angular positions about the axis of said torsion spring comprising a rack on said seat frame alongside said adjusting lever and a lip on said adjusting lever and arranged to be selectively engaged with different teeth of said rack.

References Cited in the file of this patent

UNITED STATES PATENTS

| Number | Name | Date |
|---|---|---|
| 1,664,129 | Pallenberg | Mar. 27, 1928 |
| 2,267,917 | Hickman | Dec. 30, 1941 |
| 2,460,596 | Roche | Feb. 1, 1949 |
| 2,588,638 | Krotz | Mar. 11, 1952 |

FOREIGN PATENTS

| Number | Country | Date |
|---|---|---|
| 229,023 | Great Britain | Feb. 19, 1925 |
| 271,045 | Italy | July 20, 1927 |
| 695,182 | France | Sept. 29, 1930 |
| 80,224 | Sweden | Apr. 24, 1934 |
| 450,142 | Great Britain | July 8, 1936 |